INVENTORS
PAUL E. SEIFRIED
CHARLES E. HURLBURT

INVENTORS
PAUL E. SEIFRIED
CHARLES E. HURLBURT
BY Herbert L. Davis
ATTORNEY

INVENTORS
PAUL E. SEIFRIED
CHARLES E. HURLBURT
BY *Herbert L. Davis*
ATTORNEY

United States Patent Office 2,951,378
Patented Sept. 6, 1960

2,951,378

DIRECTIONAL GYRO HAVING IMPROVED MEANS FOR CAGING A DIRECTIONAL SIGNAL TRANSMITTING SYNCHRO TO A NULL SIGNAL POSITION

Paul E. Seifried, New City, N.Y., and Charles E. Hurlburt, River Edge, N.J., assignors to The Bendix Corporation, a corporation of Delaware Filed June 29, 1959, Ser. No. 823,499

8 Claims. (Cl. 74—5.6)

This invention relates to an improved directional gyro for use in a signal transmitting system such as disclosed schematically in copending U.S. application Ser. No. 565,726, filed February 15, 1956, by Francis J. Thornton and Joseph R. Conway and assigned to Bendix Aviation Corporation, and more particularly to improved means for caging a directional gyro signal transmitting synchro to a null signal transmitting position.

Heretofore the directional gyro signal has been nulled out with respect to the gyro case by electrically slaving the gyro gimbal to a position which achieves the null position or by means of caging devices including mechanical levers, linkages and cams. Such prior devices required either complicated electronic control systems or complicated operating linkages and lever and cam mechanisms.

An object of the present invention is to provide a directional gyro embodying the desirable operational features of the usual caged or slaved directional gyro, but including a more simple mechanism for achieving the desired effect with rapidity and a mechanism that may be effective within extreme space limitations not conducive to use of the usual mechanisms for caging and positioning the gyro within the gyro casing.

Another object of the invention is to provide improved means for nulling a directional signal transmitting synchro to the heading of an aircraft or other vehicle so that the output reading may be rotated three hundred and sixty degrees (360°) at will without changing the position of the gyro and without affecting its operational performance.

Moreover in the conventional structure the directional output signal transmitting synchro has a rotor element affixed to the pivot shaft of the outer gimbal of the gyro so as to transmit a signal indicative of the position of the rotor element relative to the gyro case to which the stator element of the synchro is affixed. In distinction an object of the present invention is to mount the rotor element of the synchro not on the pivot shaft of the outer gimbal of the synchro, but rather on suitable bearings concentric with such pivot shaft and to provide a frictional spring to normally operatively connect the rotor element to the pivot shaft so that the rotor element normally tends to follow the outer gimbal just as though the rotor element were affixed to the pivot shaft, but through the provision of novel operator-operative mechanism the tension of the aforenoted friction spring may be overcome so as to permit the position of the rotor element to be changed relative to the stator element of the synchro so as to null the synchro to the position of the aircraft or other vehicle.

Another object of the invention is to secure the stator element of a directional gyro signal transmitting synchro to the inner surface of the gyro instrument casing and about a cam mechanism so that upon a rocker arm linked to the instrument case applying pressure to the cam mechanism affixed to the rotor element of the synchro, the friction spring operatively connecting the rotor element to the pivot shaft of the outer gimbal of the gyro permits the rotor element to be shifted to a null position without regard to the actual position of the outer gimbal of the gyro.

Another object of the invention is to provide in such arrangement a solenoid and plunger operative thereby to actuate a spring for loading the rocker arm so that the load spring may bias the rotor element through the cam to a null signal position relative to the stator element and in which arrangement a first switch device may be actuated by the rocker arm so as to partially de-energize the solenoid after initial effective energization thereof and other switch means rendered effective to control a suitable indicator means upon the rocker arm under the biasing force of the load spring actuating the cam and synchro rotor element to the null signal position.

Another object of the invention is to provide in such arrangement a mechanism in which the biasing force of the load spring is sufficient in effecting the nulling action to overpower the effect of the friction spring tending to operatively connect the rotor element of the synchro to the pivot shaft of the outer gimbal of the directional gyro, and although there may be applied through the pivot shaft in such action a slight torque to the gyro such torque is opposed by a torquermotor acting in response to the controlling action of a leveling switch so that there is no detrimental effect to the directional output of the gyro.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for illustration purposes only and are not to be construed as defining the limits of the invention.

Figure 1:
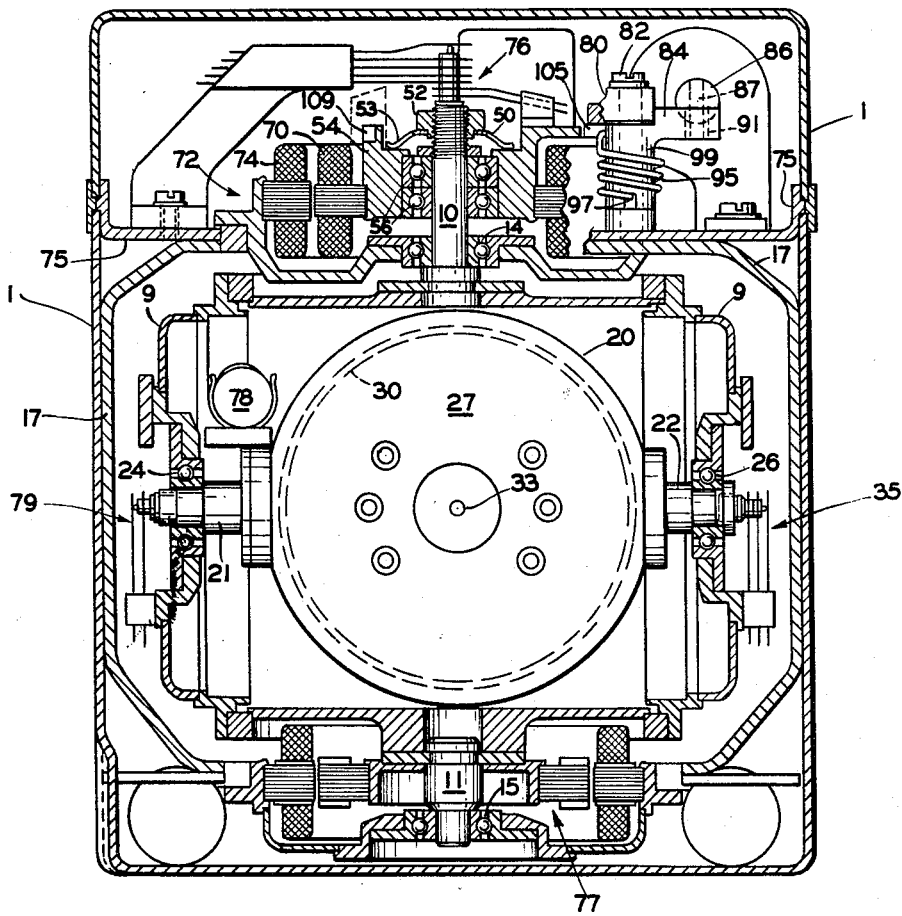
Figure 1 is a side sectional view of a directional gyro instrument embodying the invention, with certain parts broken away and certain parts shown in section for better illustration thereof.
Figure 2:
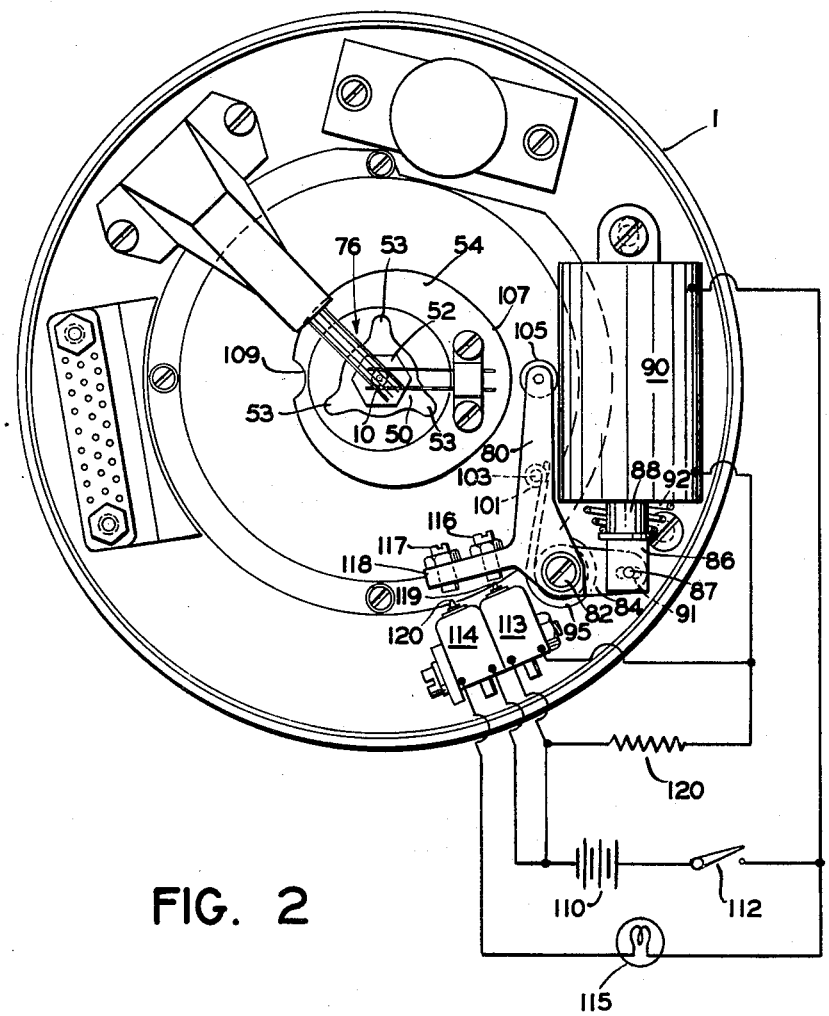
Figure 2 is a top plan view of the gyro instrument of Figure 1 with the upper casing wall broken away so as to show the novel cam and operating mechanism for actuating the rotor element of the directional signal transmitting synchro to a null position.

Reference is now directed to the drawings wherein there is shown in Figures 1 and 2 a can or casing 1 in which the directional gyro mechanism of the subject invention is contained.

The directional gyro mechanism is designed for use in a direction signal transmitting system of a type disclosed and claimed in the aforenoted U.S. application Serial No. 565,726 and in which system there may be provided a servomotor means controlled by the directional gyro for controlling a suitable indicator mechanism including a pointer cooperating with a dial to give heading information of the craft or vehicle.

The can or casing 1 is suitably mounted on the movable craft and only so much of the structure of the gyro mechanism as may be necessary to illustrate the present invention is shown in the drawings.

The gyroscopic mechanism includes an outer gimbal 9 having vertical axis shafts 10 and 11 axially mounted in suitable bearings 14 and 15 for three hundred and sixty degrees (360°) of rotation. The bearings 14 and 15 are supported by a frame 17 affixed to the inner surface of the casing 1. Located within the outer gimbal 9 is an inner gimbal 20 having a horizontal axis defined by trunnions 21 and 22 supported for rotation by bearings 24 and 26 carried in the outer gimbal 9.

Mounted on the inner gimbal 20 is a cover 27 and within the cover 27 and rotatably supported by the inner gimbal 20 is a gyro rotor 30 shown in dotted lines and the detail structure of which is not necessary to an understanding of the invention. The gyro rotor 30, however, is of an electrically driven motor type having a spin axis 33 rotatably supported by the cover 27 and inner gimbal 20. There are further provided contactor brushes 35 for applying electrical energy through suitable conductor means in the shaft 22 to the motor means for driving the gyro rotor 30.

The spin axis 33 of the gyro 30 in normal operation of the instrument extends perpendicular to the vertical axis of shafts 10 and 11, of the outer gimbal 9 while the vertical axis of the outer gimbal shafts 10 and 11, is in turn perpendicular to the horizontal axis of the inner gimbal trunnions 21 and 22.

As shown in Figure 1, the shaft 10 secured to the outer gimbal 9 is arranged to normally operatively position a rotor element 70 of a suitable synchro 72 through a novel leaf or friction spring 50 affixed to the shaft 10 by a fastening nut 52 and having fingers 53 frictionally bearing at its free ends on a cam 54 rotatably supported by bearings 56 on the shaft 10 and affixed to the rotor element 70. The rotor element 70, as normally positioned, serves to reflect azimuth indication of the directional gyro. The synchro 72 includes the rotor element 70 and a stator element 74 supported by a base plate 75 affixed to the frame 17 and casing 1. The rotor element 70 has windings suitably connected through suitable contactor brushes 76 and conductor means in shaft 10 to a remote servomotor, as explained in the aforenoted U.S. application Serial No. 565,726, so as to effectively control the relative position of a suitable indicator pointer and dial and to thereby indicate to the pilot the direction of flight of the plane or control the direction of flight of an aircraft or missile, as the case may be.

The shaft 11 affixed to the lower end of the outer gimbal 9 is operatively connected to a leveling torquer motor 77 controlled in a conventional manner by a suitable level or tilt-angle sensor switch 78, as explained in the aforenoted U.S. application Serial No. 565,726 and which switch 78 may be of a type disclosed and claimed in U.S. Patent No. 2,890,430, granted June 9, 1959, to Fred Jean Cid and assigned to Bendix Aviation Corporation. The tilt-angle responsive switch 78 is electrically connected through contactor brushes 79 so as to control the torquer motor 77 and thereby cause the gyro to precess into maintaining the spin axis of the gyro 30 perpendicular to the vertical axis 10—11 of the outer gimbal 9.

*Improved caging means*

The cam 54 rotatably supported on the shaft 10 by the bearings 56 is affixed to the rotor winding 70 and operatively connected through the leaf spring 50 to the pivot shaft 10 of the gimbal 9. The leaf spring 50 is connected to the shaft 10 by a fastening nut 52 and has finger portions 53 frictionally bearing on the upper surface of the cam 54, as shown in Figure 1.

There is further provided, as shown in Figure 2, a rocker arm 80 pivotally supported by a bolt 82 mounted on the base plate 75 and frame 17 and supported therethrough by the casing 1. There is further pivotally mounted on the bolt 82 a second arm 84 connected by a link 86 to a plunger 88 of an actuating solenoid 90. The link 86 has a pin 87 operatively connected in a slot 91 in the arm 84. A spring 92 biases the plunger 88 to the outward position shown in Figure 2 upon deenergization of the solenoid 90. A load spring 95 fastened at one end 97 to a portion 99 of the arm 84 is wound about the portion 99 of the arm 84 and at its opposite end 101 is looped around a pin 103 projecting from the rocker arm 80. Thus, upon energization of the solenoid 90 the plunger 88 is drawn inwardly against the biasing force of the spring 92 and the arm 84 is actuated in a counterclockwise direction, as shown in Figure 2, so as to cause the load spring 95 to be tensioned so as to apply through the pin 103 a biasing force on the rocker arm 80 tending to actuate the arm 80 in a counterclockwise direction around the pivot bolt 82 causing a roller 105 at the free end of the rocker arm 80 to be brought into contacting relation with a cam surface 107 of the cam 54, which, as shown in Figure 2, is formed generally in the shape of a heart having a notch 109 provided therein to receive the roller 105 at the free end of the rocker arm 80 at the extreme limit of movement of arm 80 under the biasing force of the load spring 95.

Energization of the solenoid 90 is affected through a circuit including a source of electrical energy or battery 110, a manually operable switch 112 and control switch 113. A second control switch 114 is connected in a second circuit including an indicator means such as a light 115 and the switch 112 and battery 110. The switches 113 and 114 are normally biased to circuit closing positions and are actuated to circuit opening positions by contactor elements 116 and 117 carried by a portion 118 of the arm 80 and arranged to operate sequentially switch actuating buttons 119 and 120 to open respectively the control switch 113 after initial energization of the solenoid 90 and the control switch 114 at an extreme limit position of the arm 80.

It will be seen then that upon energization of the solenoid 90 by the closing of the switch 112 the plunger 88 is drawn into the solenoid 90 so as to fully tension the spring 95 whereupon the rocker arm 80 is biased by the spring 95 in a counterclockwise direction causing contactor 116 to actuate the switch control button 119 to open switch 113 so as to render effective a resistor 120 connected in shunting relation to the switch 113. The resistor 120 thereby becomes effective after initial energization of the solenoid 90 and upon the plunger 88 being drawn into the solenoid 90. The resistor 120 on becoming effective decreases the energization of the solenoid 90 to a value sufficient to hold the plunger 88 in the inward position, while preventing an excessive energization of the solenoid 90 which might otherwise cause the solenoid 90 to generate excessive heat and to break down.

The plunger 88 in the inward position fully tensions the load spring 95 and there is applied by the fully tensioned load spring 95 a biasing force on the rocker arm 80 which in contacting the cam surface 107 of the heart shaped cam 54 overcomes the lesser frictional effect of the smaller leaf spring 50, tending to release the cam 54 from the shaft 10; so that the load spring 95 causes cam 54 and rotor element 70 of the synchro 72 to turn on the bearings 56 relative to the shaft 10 until the rotor element 70 is readjusted by the biasing force of the load spring 95 to a null signal transmitting position relative to the stator winding 74. In the null signal position, the roller 105 fits into the notch 109 in the heart shaped cam 54 and in which extreme position the contactor element 117 carried by the portion 118 of the rocker arm 80 actuates the limit switch button 120 causing the switch 114 to open the energizing circuit for the indicator light 115 which is arranged so as to be visible to an operator of the switch 112 to provide an indication that the synchro 72 is in a null position. Thereupon the manually operable switch 112 may be opened by the operator, deenergizing the solenoid 90 and causing the plunger 88 to be biased by the spring 92 to the outward position shown in Figure 2. The load spring 95 bearing at 101 on pin 103 then causes the rocker arm 80 to return to the normal position out of contacting relationship with the cam surface 107 of the heart shaped cam 54.

In the aforenoted arrangement, it will be seen that the relative strengths of the leaf spring 50 and the load spring 95 are such that the load spring 95, when brought into operative relation by energization of the solenoid 90, is such as to overpower the frictional effect of the smaller leaf spring 50. However, when the load spring 95 is not brought into operative relation, the fingers 53 of the smaller leaf spring 50 apply sufficient frictional force to the cam 54 as to normally hold the rotor element 70 of the synchro 72 to the pivot shaft 10 of the outer gimbal 9 of the directional gyro.

However, when the biasing force of the load spring 95 is applied through the rocker arm 80 to the cam 54 so as to overpower the frictional effect of the smaller leaf spring 50, there is applied by the drag effect of the leaf spring 50 a slight torque through the pivot shaft 10 and upon the gyro. The direction of such torque is opposed by a counter torque applied by the torquer motor 77 in response to the controlling action of the level or tilt-angle sensor switch 78 so that there is no detriment to the directional output of the gyro.

In the aforenoted novel arrangement, it will be seen that through the provision of the small leaf spring 50 the rotor 70 of the synchro 72 is caused to normally follow the outer gimbal 9 just as though the rotor 70 were affixed to the pivot shaft 10. The frictional force of the leaf spring 50 tending to drivingly connect the pivot shaft 10 to the synchro rotor 70 may be overcome by external pressure being applied to the gyro rotor 70 and that may be done through operation of the novel mechanism herein provided, whenever it is desired by the operator to null the synchro 72 to the present position of the vehicle or flight heading of the aircraft.

The foregoing is accomplished by affixing the synchro stator 74 to the base plate 75 and frame 17 and thereby to instrument casing 1 and affixing the synchro rotor 70 to a cam 54 having a rocker arm 80 cooperating with the cam surface 107 thereof so as to turn the synchro rotor 70 relative to the pivot shaft 10 as well as to the synchro stator 74 upon the rocker arm 80 linked to the instrument casing 1 applying a pressure on the cam 54. Thus the synchro rotor 70 will be positioned without regard to the actual position of the outer gimbal 9 and gyro to a position at which there is effected a null signal at the present heading of the aircraft.

In the foregoing arrangement, the solenoid 90 serves to actuate the plunger 88 so as to tension a load spring 95 to apply a biasing force to the rocker arm 80 and thereby a force to the cam 54 sufficient to overcome the relatively weaker frictional effect of the leaf spring 50 and turn the synchro rotor 70 to the null signal position at the prevailing heading of the vehicle or aircraft at such time.

Modified form of the invention

Figure 3:
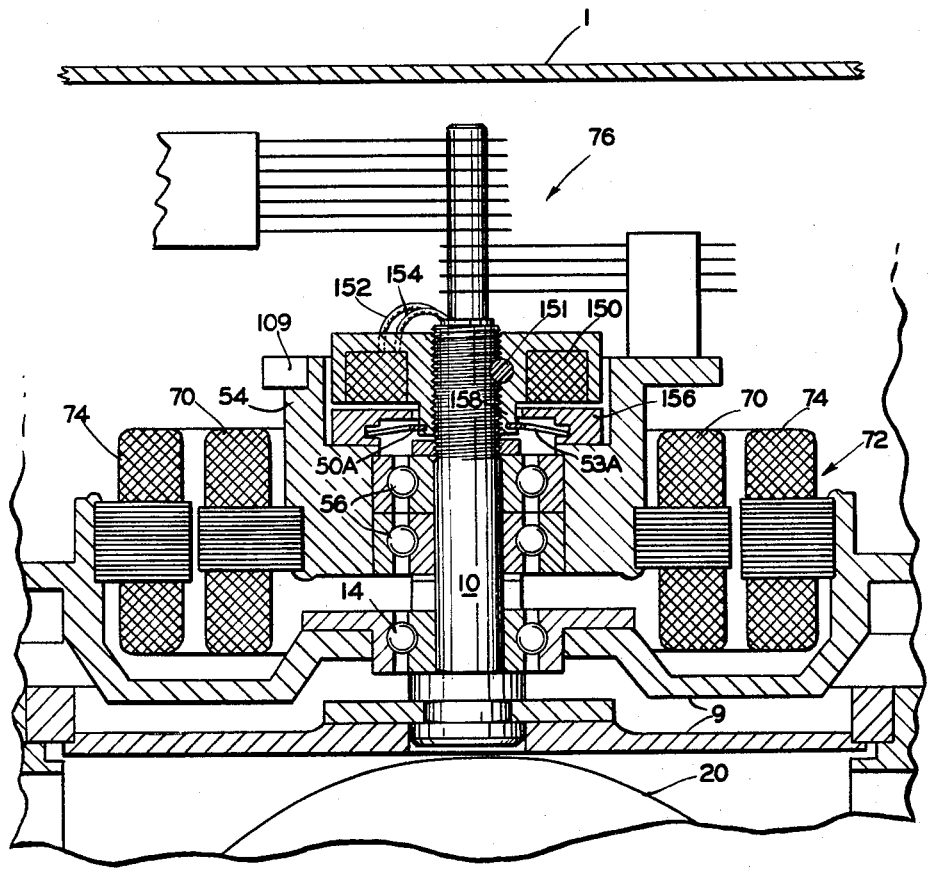
Figure 3 is an enlarged fragmentary side sectional view of a modified form of the invention.

A modified form of the invention is illustrated in Figure 3, in which corresponding numerals indicate corresponding parts to those described with reference to Figures 1 and 2 and in which there is provided an electromagnet 150 screw threadedly engaged on the pivot shaft 10 and locked in position thereon by a slug of nylon 151. The electromagnet 150 is arranged to lift the leaf spring 50A from operative relation upon energization thereof and during the caging operation.

The electromagnet 150 has energizing conductors 152 and 154 connected through suitable contactor brushes 76 to a source of electrical energy. The electromagnet 150 may be thereby connected in parallel relation with the actuating solenoid 90 and in the energizing circuit therefor as heretofore described with reference to Figure 2.

Thus upon the manually operable switch 112 being closed the electromagnet 150 is energized to draw upwardly an armature 156, while the armature 156 is normally biased by the leaf spring 50A into contacting relation with the upper surface of the cam 54 upon deenergization of the electromagnet 150.

The leaf spring 50A is keyed to a lower sleeve portion 158 of the electromagnet 150 which is in turn connected to the pivot shaft 10 while the leaf spring 50A has finger portions 53A engaging in the armature 156 so that upon deenergization of the electromagnet 150 the armature 156 is normally biased by the leaf spring 50A into contacting driving relation with the upper surface of the cam 54 to drivingly connect the pivot shaft 10 to the rotor element 70 of the synchro 72 through the sleeve portion 158, leaf spring 50A, fingers 53A, armature 156, cam 54 and rotor element 70 connected thereto.

The operation of the form of the invention illustrated in Figure 3, is essentially the same as that heretofore described with reference to the device of Figures 1 and 2 except that during the caging operation in biasing the synchro rotor 70 to the null position, the leaf spring 50A does not frictionally bear upon the upper surface of the cam 54, but instead is raised out of contacting relation therewith by the operation of the electromagnet 150 so that the load spring 95 may bias the rotor element 70 to the null position without the opposing frictional force of the leaf spring 50A.

Although only two embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a gyroscope of the type including a rotor adapted to rotate about a spin axis, a member supporting said rotor for movement about the spin axis, a gimbal pivotally supporting said member for adjustment about a second axis perpendicular to said spin axis, a base, shaft means carried by said base for pivotally supporting said gimbal for adjustment about an axis perpendicular to said second axis, and signal transmitting means including a stator element and a rotor element, said stator element being carried by said base; the improvement comprising an adjustable means operatively connected to said rotor element and rotatably mounted on said shaft means, frictional means to releasably connect said adjustable means and thereby said rotor element to said shaft means, and means for applying a biasing force to said adjustable means to rotatably adjust the rotor element independently of said shaft means to a predetermined null signal position relative to said stator element.

2. In a gyroscope of the type including a rotor adapted to rotate about a spin axis, a member supporting said rotor for movement about the spin axis, a gimbal pivotally supporting said member for adjustment about a second axis perpendicular to said spin axis, a base, shaft means carried by said base for pivotally supporting said gimbal for adjustment about an axis perpendicular to said second axis, and signal transmitting means including a stator element and a rotor element, said stator element being carried by said base; the improvement comprising a rotatable cam operatively connected to said rotor element and rotatably mounted on said shaft means, a leaf spring affixed to said shaft means and frictionally bearing on said cam to drivingly connect the shaft means to said cam and rotor element, and means for applying a biasing force to the cam so as to cause a rotation thereof effective to overcome the frictional force of the leaf spring and to rotatably adjust through the rotation of the cam the rotor element to a predetermined null signal position relative to said stator element.

3. In a gyroscope of the type including a rotor adapted to rotate about a spin axis, a member supporting said rotor for movement about the spin axis, a gimbal pivotally supporting said member for adjustment about a second axis perpendicular to said spin axis, a base, shaft means carried by said base for pivotally supporting said gimbal for adjustment about an axis perpendicular to said second axis, and signal transmitting means including a stator element and a rotor element, said stator element being carried by said base; the improvement comprising a rotatable cam operatively connected to said rotor element and rotatably mounted on said shaft means, means for coupling the shaft means to said cam, said coupling means including electromagnetic means operatively connected to the shaft means, an armature in cooperative relation with said electromagnetic means, leaf spring means operatively connected between said electromagnetic means and said armature to bias the armature in one sense into contacting driving relation with said cam, and the electromagnetic means to bias the armature in another sense out of contacting driving relation with said cam, and load spring means for applying a biasing force to the cam so as to cause a rotation thereof effective to rotatably adjust the rotor element to a predetermined null signal position relative to said stator element upon said armature being biased in said other sense out of contacting driving relation with said cam.

4. In a gyroscope of the type including a rotor adapted to rotate about a spin axis, a member supporting said rotor for movement about the spin axis, a gimbal pivotally supporting said member for adjustment about a second axis perpendicular to said spin axis, a base, shaft means carried by said base for pivotally supporting said gimbal for adjustment about an axis perpendicular to said second axis, and signal transmitting means including a stator element and a rotor element, said stator element being carried by said base; the improvement comprising means to adjustably position said rotor element, means to frictionally connect said shaft means to said adjustable means to effectively position said rotor element, load spring means to apply a biasing force to said adjustable means independently of said shaft means, and operator-operative means to tension said load spring means so as to overpower said frictional means and effect a rotatable adjustment of the rotor element independently of said shaft means and to a predetermined null signal position relative to said stator element.

5. The combination defined by claim 4 including a motor for applying a torque to said shaft means, and a switch responsive to an adjusted position of the member about said second axis for controlling said motor so as to apply to the shaft means a torque acting in a sense to oppose a torque applied thereto by said frictional means.

6. In a directional gyroscope of the type including a rotor adapted to rotate about a spin axis, a member supporting said rotor for movement about the spin axis, a gimbal pivotally supporting said member for movement about a second axis perpendicular to said spin axis, a base, shaft means carried by said base for pivotally supporting said gimbal for movement about a vertical axis perpendicular to said second axis, and signal transmitting means including a stator element and a rotor element, said stator element being carried by said base; the improvement comprising an adjustable cam operatively connected to said rotor element and rotatably mounted on said shaft means, a leaf spring affixed to said shaft means and frictionally bearing on said cam to drivingly connect the shaft means to said cam and rotor element, load spring means to apply a biasing force to said cam and rotor element independently of said shaft means, operator-operative means to tension said load spring means so as to overpower the frictional effect of said leaf spring on said cam and effect independently of said shaft means a rotatable adjustment of said rotor element to a predetermined null signal position relative to said stator element, a motor to apply a torque to said vertical shaft means, and a switch responsive to the adjusted position of the member about said second axis for controlling said motor so as to apply to the shaft means a torque acting in a sense to oppose a torque applied thereto by the frictional effect of said leaf spring on the cam.

7. In a directional gyroscope of the type including a rotor adapted to rotate about a spin axis, a member supporting said rotor for movement about the spin axis, a gimbal pivotally supporting said member for movement about a second axis perpendicular to said spin axis, a base, shaft means carried by said base for pivotally supporting said gimbal for movement about a vertical axis perpendicular to said second axis, and signal transmitting means including a stator element and a rotor element, said stator element being carried by said base; the improvement comprising an adjustable cam operatively connected to said rotor element and rotatably mounted on said shaft means, means frictionally bearing on said cam to drivingly couple the shaft means to said cam and rotor element, load spring means to apply a biasing force to said cam and rotor element independently of said shaft means, motor means to tension said load spring means to effect a rotatable adjustment of the rotor element independently of said shaft means to a predetermined null signal position relative to said stator element, and operator-operative means to control said motor means.

8. The combination defined by claim 7 including spring means for actuating the coupling means in one sense to drivingly connect the shaft means to said cam and rotor element, electromagnetic means mounted on the shaft means for actuating the coupling means in another sense to disconnect the shaft means from driving said cam and rotor element, and said electromagnetic means being controlled by said operator-operative means.

References Cited in the file of this patent

UNITED STATES PATENTS

| | | |
|---|---|---|
| 2,008,058 | Boykow | July 16, 1935 |
| 2,887,884 | Hochstetler et al. | May 26, 1959 |